(12) United States Patent
Sundahl et al.

(10) Patent No.: US 6,456,016 B1
(45) Date of Patent: Sep. 24, 2002

(54) COMPENSATING ORGANIC LIGHT EMITTING DEVICE DISPLAYS

(75) Inventors: Robert C. Sundahl, Phoenix, AZ (US); Lawrence A. Booth, Jr., Phoenix, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/918,137

(22) Filed: Jul. 30, 2001

(51) Int. Cl.[7] .............................................. G05F 1/00
(52) U.S. Cl. ................ 315/291; 315/169.3; 315/169.1; 315/360; 345/214; 345/98
(58) Field of Search ........................... 315/169.3, 169.1, 315/291, 307, 360, 362; 345/214, 208, 98, 99, 80, 84

(56) References Cited

U.S. PATENT DOCUMENTS

| | | | | |
|---|---|---|---|---|
| 4,443,741 A | * | 4/1984 | Tanaka et al. | 315/158 |
| 5,493,183 A | * | 2/1996 | Kimball et al. | 315/156 |
| 5,821,690 A | * | 10/1998 | Martens et al. | 313/504 |
| 6,023,259 A | * | 2/2000 | Howard et al. | 315/169.1 |
| 6,144,162 A | | 11/2000 | Smith | 315/169.1 |

* cited by examiner

*Primary Examiner*—Haissa Philogene
(74) *Attorney, Agent, or Firm*—Trop, Pruner & Hu, P.C.

(57) ABSTRACT

The lifetime of an organic light emitting device display may be increased by initially driving the display at a substantially constant luminance. For example, over an initial period of the display's lifetime, the display may be driven at a level that may be below its maximum possible light output. After a given amount of time at a substantially constant output luminance, the luminance may be gradually decreased over a second portion of the lifetime of the display.

20 Claims, 5 Drawing Sheets

COMPENSATING ORGANIC LIGHT EMITTING DEVICE DISPLAYS

BACKGROUND

This invention relates generally to organic light emitting device (OLED) displays that have light emitting layers.

Organic light emitting device (OLED) displays use layers of light emitting materials. Unlike liquid crystal devices, the OLED displays actually emit light that may make them advantageous for many applications.

Some OLED displays may use at least one semiconductive conjugated polymer sandwiched between a pair of contact layers. Other OLED displays may use so-called small molecule materials. The contact layers produce an electric field that injects charge carriers into the polymer layer. When the charge carriers combine in the polymer layer, the charge carriers decay and emit radiation in the visible range.

It is believed that polymer compounds containing vinyl groups tend to degrade over time and use due to oxidation of the vinyl groups, particularly in the presence of free electrons. Since driving the display with a current provides the free electrons in abundance, the lifetime of the display is a function of total output light. Newer compounds based on fluorine have similar degradation mechanisms that may be related to chemical purity, although the exact mechanism is not yet well known in the industry. In general, OLED displays, in general, have a lifetime limit related to the total output light. This lifetime is a function of intrinsic lifetime and the display usage model.

The gradual decrease in display output, at constant current, can be compensated by a corresponding increase in current. However, the degradation may not be uniform across the display. If some of the pixels of the display are degraded non-uniformly, a uniform increase in current does not solve the non-uniform degradation problem. Even after compensation, some pixels will be brighter than other pixels.

Thus, there is a need for better ways of controlling OLED displays.

DETAILED DESCRIPTION

Figure 1:
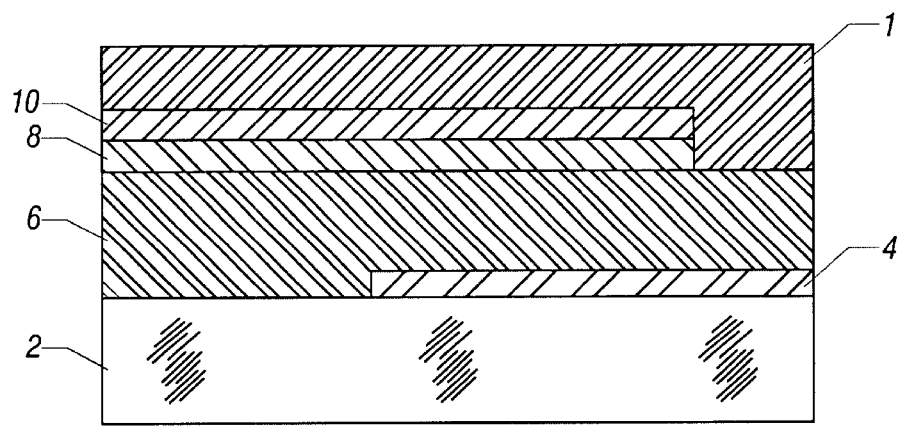
FIG. 1 is an enlarged cross-sectional view of a pixel useful in one embodiment of the present invention.

In one embodiment of the present invention, an OLED display may include a pixel formed of three distinct color emitting "sub-pixels." In this way, colors may be produced by operating more than one of the sub-pixels to provide a "mixed" color. A display of the type shown in FIG. 1 is disclosed in U.S. Pat. No. 5,821,690 to Martens et al. and assigned to Cambridge Display Technology Limited. While techniques discussed in the '690 patent are described herein, other OLED technologies may be utilized in connection with the present invention as well. Embodiments of the present invention may use polymer or "small molecule" OLED materials. Embodiments of the present invention may use stacked red, green, blue structures, or side by side red, green and blue sub-pixels. Other color spaces may be used as well.

Referring to FIG. 1, a glass substrate 2 supports the remaining layers and issues the output light from the sub-pixel. A layer of transparent conductive material such indium tin oxide 4 may be deposited on the substrate 2 and etched to have a reduced size compared to the dimensions of the substrate 2. An emissive organic layer 6 may be deposited over the transparent conductive layer 4. The layer 6 may be a semiconductive conjugated polymer such as PPV in one embodiment of the invention. Other embodiments may use evaporated small molecule films. A contact layer 8 may be deposited over the organic layer 6 to provide the second electrode so an electric field may be applied to the layer 6 by the electrodes 8 and 4. The electrode 8, in one embodiment of the present invention, may be formed of calcium that may be deposited by evaporation through a mask.

On top of the electrode layer 8, a conductive layer 10 is arranged to overlie the layer 8 so that the layers 8 and 10 overlap the layer 4. Again, the layer 10 may be defined using evaporation through a mask. In some embodiments, the organic layer 6 might be made up of a sequence of more than one material, each providing a unique functionality to the OLED structure. The particular choice of this combination of organic layers will determine the color output of the sub-pixel. The overall OLED structure may be covered by a coating 1 to protect the diode from the effects of the ambient.

In the same manner as shown in FIG. 1, other sub-pixels may be formed with other combinations of organic materials to produce a range of colors. In one embodiment, a pixel consists of three sub-pixels that emit red, green and blue lights, respectively.

Figure 2:
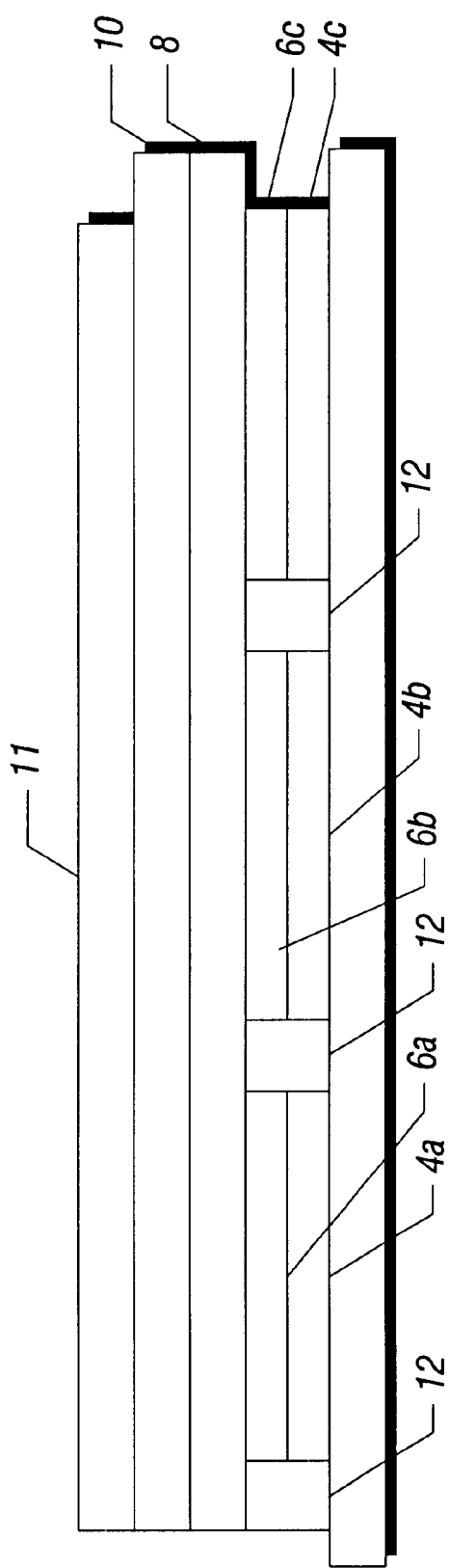
FIG. 2 is an enlarged side view of another embodiment of the present invention.

As shown in FIG. 2, in one embodiment, the three sub-pixels have individual ITO electrodes (4a, 4b, and 4c), unique organic layers (6a, 6b, 6c), and a common calcium/aluminum electrode (8, 10). In this case, the sub-pixels may be separated by an isolation layer 12.

Figure 3:
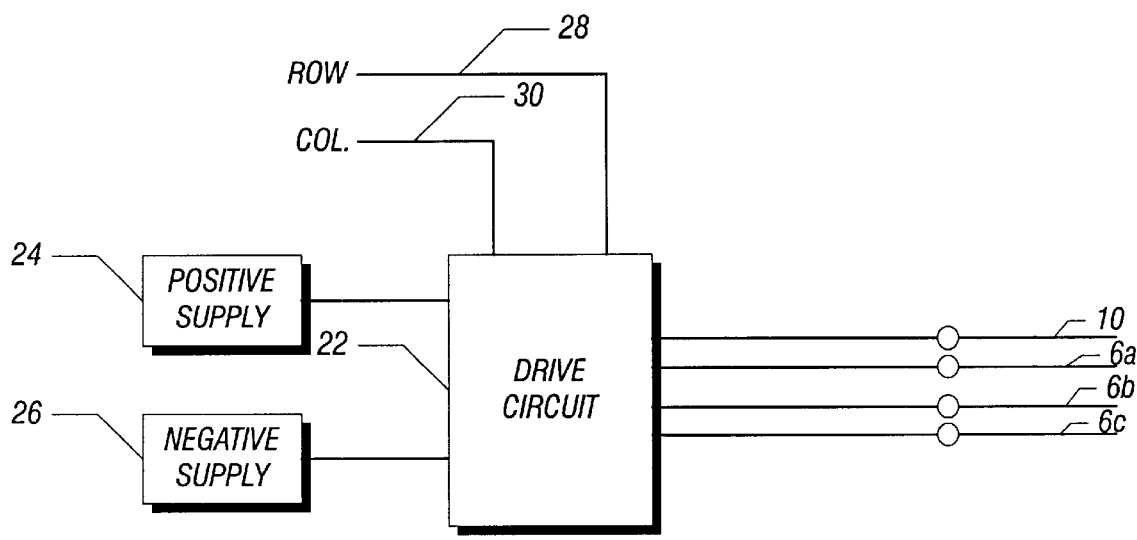
FIG. 3 is a schematic diagram of the drive circuitry that may be utilized with the embodiment shown in FIG. 1.

The various control electrodes 10, 6a, 6b, and 6c, may be coupled to a drive circuit 22 as shown in FIG. 3. The drive circuit 22, under control of the row 28 and column 30 address signals, selectively applies positive supply voltage 24 to a selected electrode 6a, 6b or 6c and a negative supply voltage 26 to a selected electrode 10. As a result, electrical fields may be selectively applied to the light emitting semiconductive materials 4a, 4b, or 4c.

Figure 4:
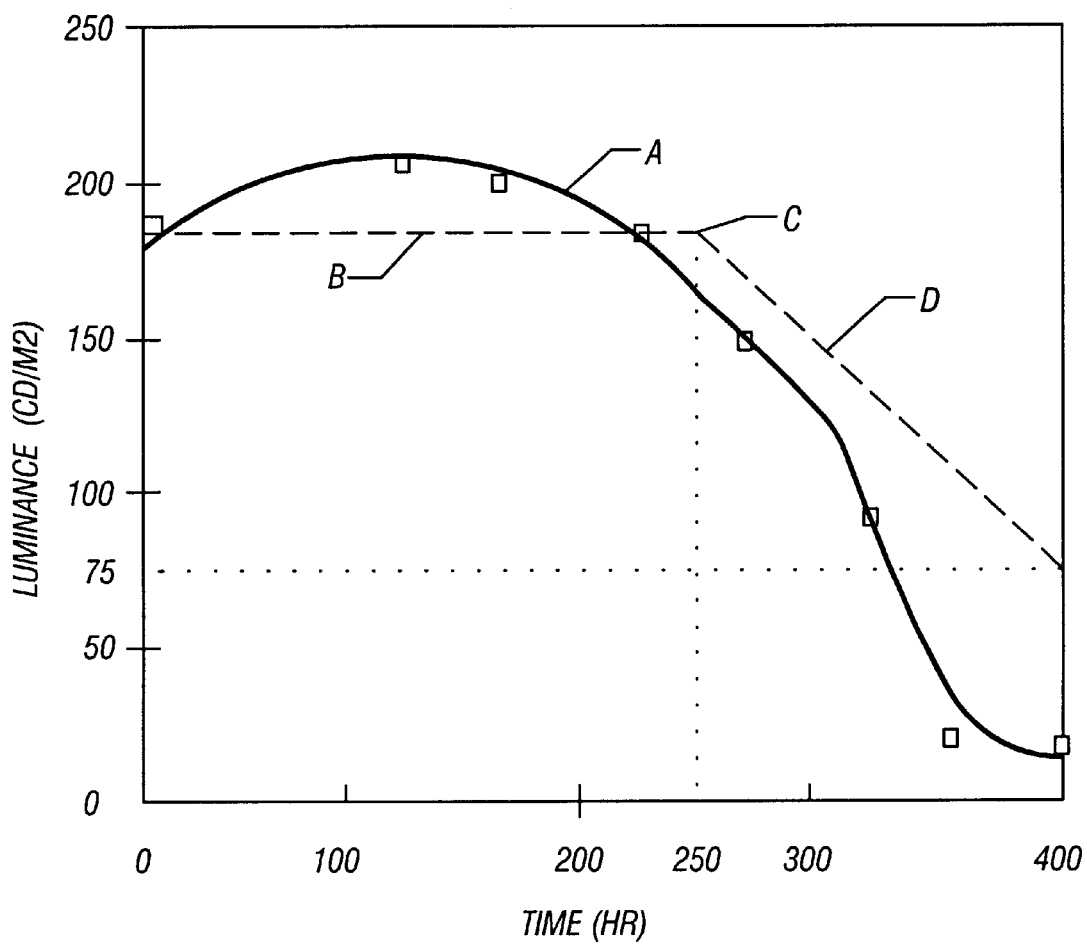
FIG. 4 is a hypothetical graph of output light versus time for a polymer display.

Referring next to FIG. 4 showing the characteristic luminance of a hypothetical polymer display, the curve A shows the luminance in candelas per square meter over time in hours throughout the lifetime of a typical emissive display. See "Recent PLED Developments at UNIAX", I. Parker, SPIE 2000. It is observed that over the first approximately 225 hours of lifetime, the display exhibits luminance in a bell curve relationship that increases over the first 100 hours and thereafter decreases until the end of life. The curve A was the result of luminance measured under conditions of constant current at an elevated temperature. Brightness increases by about 20% over the first 100 hours in one embodiment. This is followed by a continuous decay in brightness.

Instead of waiting for the decrease in brightness (that occurs for example at about 200 hours) to increase the current drive of the display, the current drive may be reduced during the early portion of the lifetime to produce the relatively constant output luminance indicated by the dashed line B. Thus, for a first portion of (approximately 250 hours in one embodiment) of display lifetime in one embodiment, the display may be driven to maintain a relatively constant brightness that is substantially less than the potential maximum brightness. In particular, if the display were sufficiently driven, it could exhibit brightness as much as about 20% higher than that indicated by the line A in one embodiment. The brightness over the later stages of life of the display (beginning at about 250 hours in one embodiment) as indicated by the cusp C, may be progressively tapered downwardly as indicated by the downwardly directed portion D. The slope for the portion D is subject to considerable variation, but, in one embodiment, the slope may be such as to reduce the luminance at a rate of about two-thirds of a candela per square meter per hour.

Using this compensation strategy, the display lifetime may be limited by the amount of current that can practically be used to maintain the chosen brightness profile. This limit may be imposed by the driver circuitry 22 or by the temperature rise of the display itself. The strategy may extend the life of the display. In other words, the point where the brightness begins to decrease may actually be extended by the portion between 200 and 250 hours by reducing the initial drive and resulting luminance below the maximum possible luminance during the period between 0 and 200 hours (i.e., the portion B).

Thus, either the current drive or temperature may be adjusted to obtain the characteristic wherein initially, the display is underdriven to the extent that it is driven to produce a relatively constant luminance which is less than the maximum possible luminance available. In some cases, the underdriving results in about a twenty percent reduction in the maximum possible luminance that could have been achieved. As a result, the amount of time when the display may be driven at a relatively high luminance (the level B) may be extended and the overall lifetime of the display may be increased. After approximately 250 hours, by gradually decreasing the drive current or temperature, the lifetime of the overall display may be increased in some embodiments.

Figure 5:
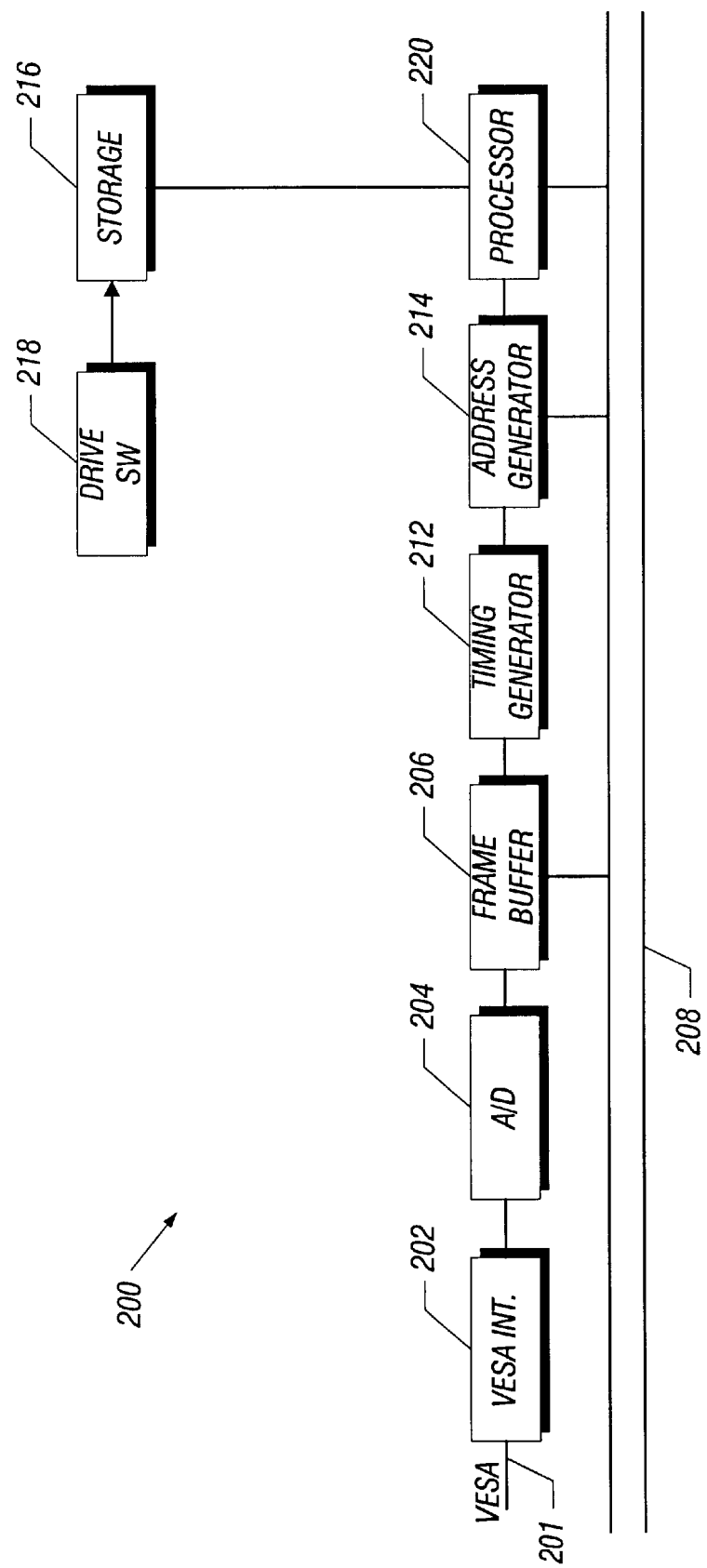
FIG. 5 is a block diagram of a system for implementing one embodiment of the present invention.

Referring to FIG. 5, the display may include an electrical system 200 that may be part of a computer system, for example, or part of a stand-alone system. In particular, the electrical system 200 may include a Video Electronic Standard Association (VESA) interface 202 to receive analog signals from a VESA cable 201. The VESA standard is further described in the Computer Display Timing Specification, V.1, Rev. 0.8 (1997). These analog signals indicate images to be formed on the display and may be generated by a graphics card of a computer, for example. The analog signals are converted into digital signals by an analog-to-digital (A/D) converter 204, and the digital signals may be stored in a frame buffer 206. A timing generator 212 may be coupled to the frame buffer 206 to regulate a frame rate by which images are formed on the screen. A processor 220 may be coupled to the frame buffer 206 and address generator 214 via a bus 208.

The processor 220 also is coupled to a storage device 216 that stores the drive software 218. In one embodiment, the drive software 218 controls the drive current to the display to achieve the characteristic indicated by the portions B and D in FIG. 4. In other embodiments, the temperature of the light emitting device may be similarly adjusted.

Figure 6:
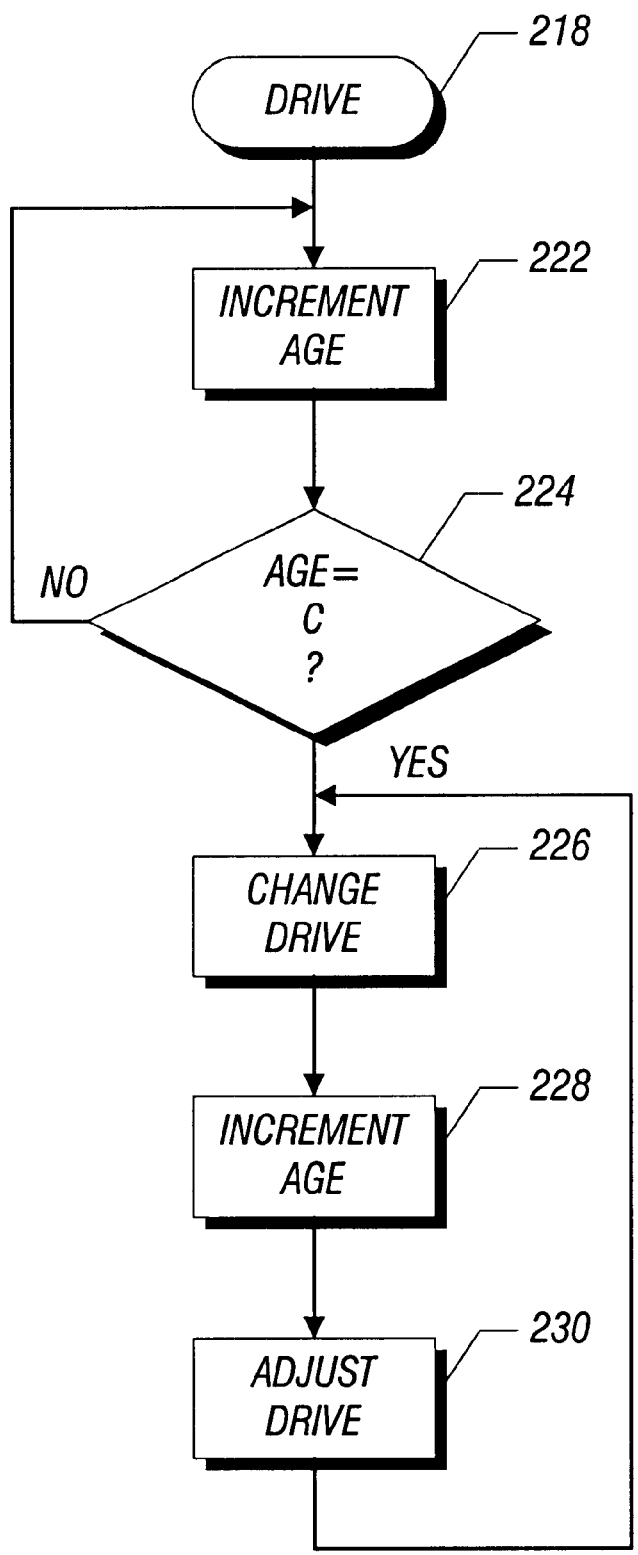
FIG. 6 is a flow chart in accordance with one embodiment of the present invention.

Turning finally to FIG. 6, the drive software 218 may begin by keeping track of the age of the display in terms of operating time. In one embodiment, the lifetime may be estimated at 400 hours. Initially, the age is zero as indicated in block 222 and the age is incremented upon each iteration. A check at diamond 224 determines whether the age has reached the cusp C in FIG. 4. In one embodiment, the cusp C is at an age of 250 hours. If not, the age is continually incremented and the drive current is applied steadily substantially at its initial value.

Once the cusp C is reached, the drive current is automatically changed as indicated in block 226. Thereafter, the age is incremented in block 228 and the drive current is adjusted in block 230. Thus, in some embodiments, the drive current is continually adjusted after passing the age indicated at C. The user may decide when to take the display out of service. In other embodiments, an indication may be provided automatically at a predetermined age (such as 400 hours) in some embodiments.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method of compensating an organic light emitting device display comprising:

driving the display at a substantially constant luminance over a first portion of its lifetime; and decreasing the luminance of the display over a second portion of the display's lifetime.

2. The method of claim 1 including linearly decreasing the luminance of the display over the second portion of the display's lifetime.

3. The method of claim 1 including driving the display at a substantially constant luminance that is less than the maximum luminance in said first portion of the display's lifetime.

4. The method of claim 1 including driving said display to have a luminance during said first portion that is substantially constant and exceeds the characteristic luminance of said display during part of said first portion.

5. The method of claim 1 including driving the display to have substantially constant luminance over a first portion of its lifetime, said constant luminance being approximately 20% less than its maximum luminance.

6. The method of claim 1 including decreasing the luminance of the display at approximately 250 hours of lifetime.

7. The method of claim 1 including decreasing the luminance of the display over a second portion of the display's lifetime at a rate of approximately one candela per square meter per hour of lifetime.

8. An article comprising a medium storing instructions that enable a processor-based system to:

drive a display at a substantially constant luminance over a first portion of its lifetime; and decrease the luminance of the display over a second portion of the display's lifetime.

9. The article of claim 8 further storing instructions that enable the processor-based system to linearly decrease the luminance of the display over the second portion of the display's lifetime.

10. The article of claim 8 further storing instructions that enable the processor-based system to drive the display at a substantially constant luminance that is less than the maximum luminance in the first portion of the display's lifetime.

11. The article of claim 8 further storing instructions that enable the processor-based system to drive said display to have a luminance during said first portion that is substantially constant and exceeds the characteristic luminance of the display during part of said first portion.

12. The article of claim 11 further storing instructions that enable the processor-based system to drive the display to have a substantially constant luminance over a first portion of its lifetime, said constant luminance being approximately 20% less than its maximum luminance.

13. The article of claim 8 further storing instructions that enable the processor-based system to decrease the luminance of the display at approximately 250 hours of lifetime.

14. The article of claim 11 further storing instructions that enable the processor-based system to decrease the luminance of the display over a second portion of the display's lifetime at a rate of approximately one candela per square meter per hour of lifetime.

15. An organic light emitting device display comprising:
a plurality of light emitting polymer elements; and
drive circuitry to operate said elements at a relatively constant luminance over an initial portion of the display's lifetime and to thereafter decrease the luminance of the elements.

16. The display of claim 15 wherein said drive circuitry operates said elements to linearly decrease the luminance of said elements.

17. The display of claim 15 wherein said circuitry drives the display at a substantially constant luminance that is less than the maximum luminance in the first portion of the display's lifetime.

18. The display of claim 15 wherein said circuitry drives said display to have a luminance during said first portion that is substantially constant and exceeds the characteristic luminance of the display during part of said first portion.

19. The display of claim 15 wherein said circuitry drives the display to have a substantially constant luminance over a first portion of the display's lifetime, said constant luminance being approximately 20% less than the maximum luminance of the display.

20. The display of claim 15 wherein said circuitry decreases the luminance of the display at approximately 250 hours of lifetime.

\* \* \* \* \*